United States Patent
Kubota et al.

(10) Patent No.: US 7,256,547 B2
(45) Date of Patent: Aug. 14, 2007

(54) SELF-BALLASTED FLUORESCENT LAMP AND LUMINAIRE

(75) Inventors: Hiroshi Kubota, Kanagawa (JP); Toshiyuki Hiraoka, Kanagawa (JP); Shinya Hakuta, Kanagawa (JP); Tsutomu Araki, Kanagawa (JP); Shinichiro Matsumoto, Kanagawa (JP); Mari Nakamura, Kanagawa (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 13 days.

(21) Appl. No.: 10/550,447

(22) PCT Filed: Mar. 11, 2004

(86) PCT No.: PCT/JP2004/003196

§ 371 (c)(1),
(2), (4) Date: Nov. 17, 2005

(87) PCT Pub. No.: WO2004/085914

PCT Pub. Date: Oct. 7, 2004

(65) Prior Publication Data

US 2006/0087258 A1    Apr. 27, 2006

(30) Foreign Application Priority Data

Mar. 24, 2003    (JP)    ............................. 2003-081506

(51) Int. Cl.
*H01J 7/44*    (2006.01)
(52) U.S. Cl. .......................................... 315/56; 315/72
(58) Field of Classification Search ................. 315/56; 313/493, 634, 491, 324; 445/66, 67, 72
See application file for complete search history.

(56) References Cited

U.S. PATENT DOCUMENTS 6,437,502 B1 *    8/2002    Nishio et al. ............... 313/493

FOREIGN PATENT DOCUMENTS

| JP | 4-209464 A | 7/1992 |
| JP | 6-310271 A | 11/1994 |
| JP | 7-85708 A | 3/1995 |

(Continued)

OTHER PUBLICATIONS

Patent Abstracts of Japan for JP2003-18850 published Jan. 17, 2003.

(Continued)

*Primary Examiner*—Thuy V. Tran
*Assistant Examiner*—Dieu Hien T Duong
(74) *Attorney, Agent, or Firm*—Darby & Darby

(57) ABSTRACT

An electrolytic capacitor and a ballast choke of a lighting circuit, are disposed on a first face of a circuit board facing a base, and a one-package switch of the lighting circuit is disposed on a second face, facing a fluorescent lamp. The one-package switch comprises field effect transistors contained in a single package and serve as two inverter switches for driving the fluorescent lamp. The one-package switch is a generally rectangular SMD with dimensions of not more than 6 mm respectively in length and width and mounted on the second face of the circuit board by means of terminals of the one-package switch. The one-package switch enhances heat dissipation properties of the circuit, enables the reduction of its dimensions, and increases the mounting efficiency.

12 Claims, 10 Drawing Sheets

FOREIGN PATENT DOCUMENTS

| | | |
|---|---|---|
| JP | 2000-82303 A | 3/2000 |
| JP | 2000-173536 A | 6/2000 |
| JP | 2002-75012 A | 3/2002 |
| JP | 2002-289143 A | 10/2002 |
| JP | 2002-298608 A | 10/2002 |
| JP | 2003-18850 A | 1/2003 |

OTHER PUBLICATIONS

Patent Abstracts of Japan for JP2000-173536 published Jun. 23, 2000.
Patent Abstracts of Japan for JP6-310271 published Nov. 4, 1994.
Patent Abstracts of Japan for JP2002-75012 published Mar. 15, 2002.
Patent Abstracts of Japan for JP2000-82303 published Mar. 21, 2000.
Patent Abstracts of Japan for JP4-209464 published Jul. 30, 1992.
Patent Abstracts of Japan for JP2002-298608 published Oct. 11, 2002.
Patent Abstracts of Japan for JP2002-289143 published Oct. 4, 2002.
Patent Abstracts of Japan for JP7-85708 published Mar. 31, 1995.
International Search Report for PCT/JP2004/003196 mailed Jun. 29, 2004.

* cited by examiner

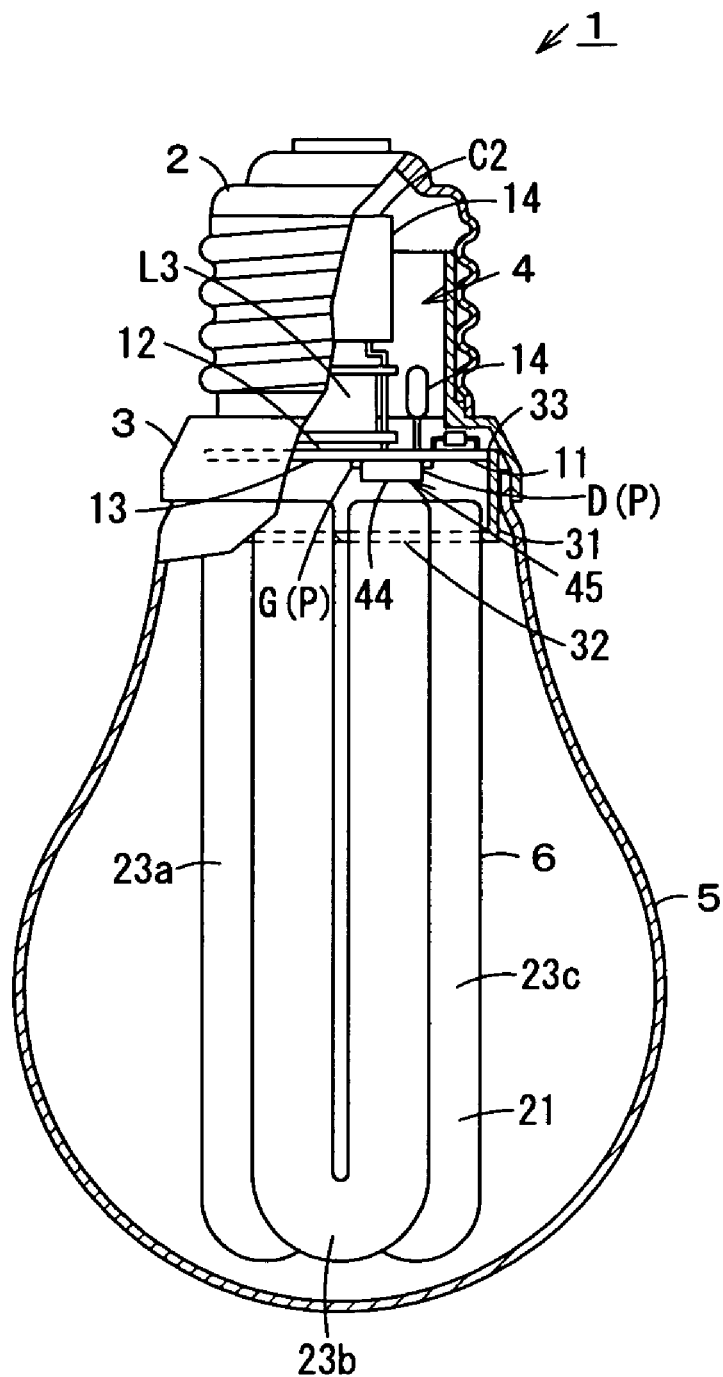
F I G. 1

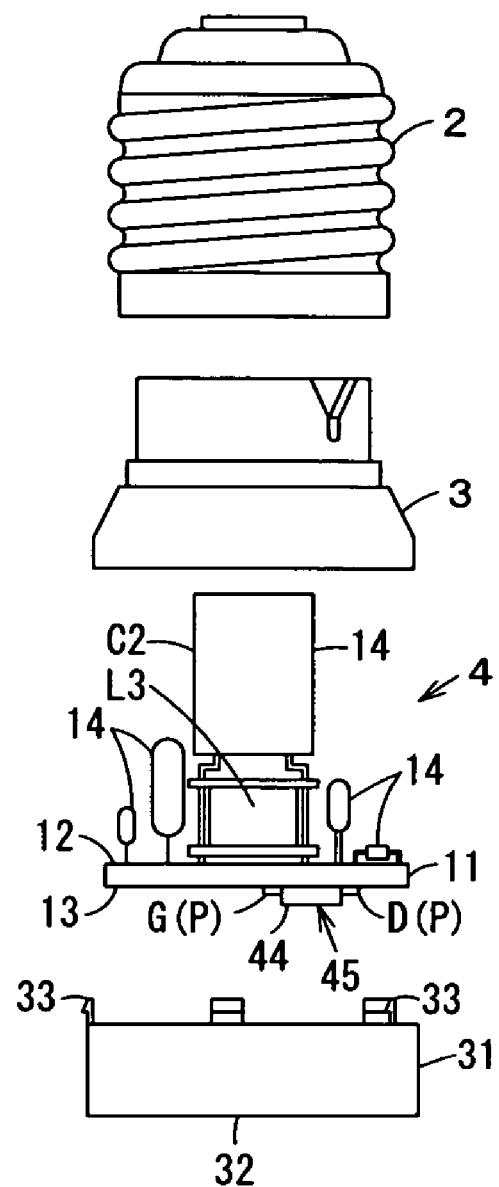
F I G. 2

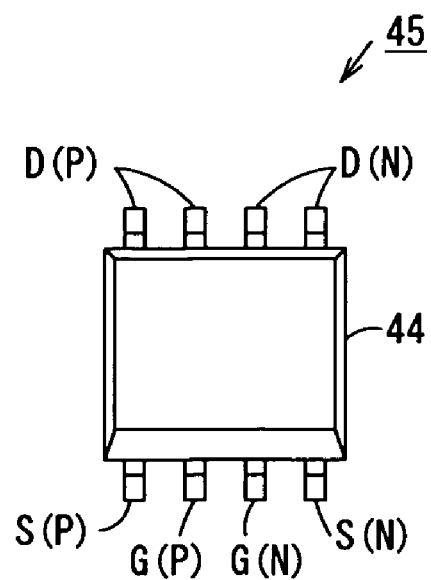
F I G. 3
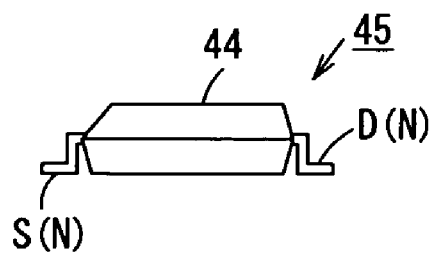
F I G. 4

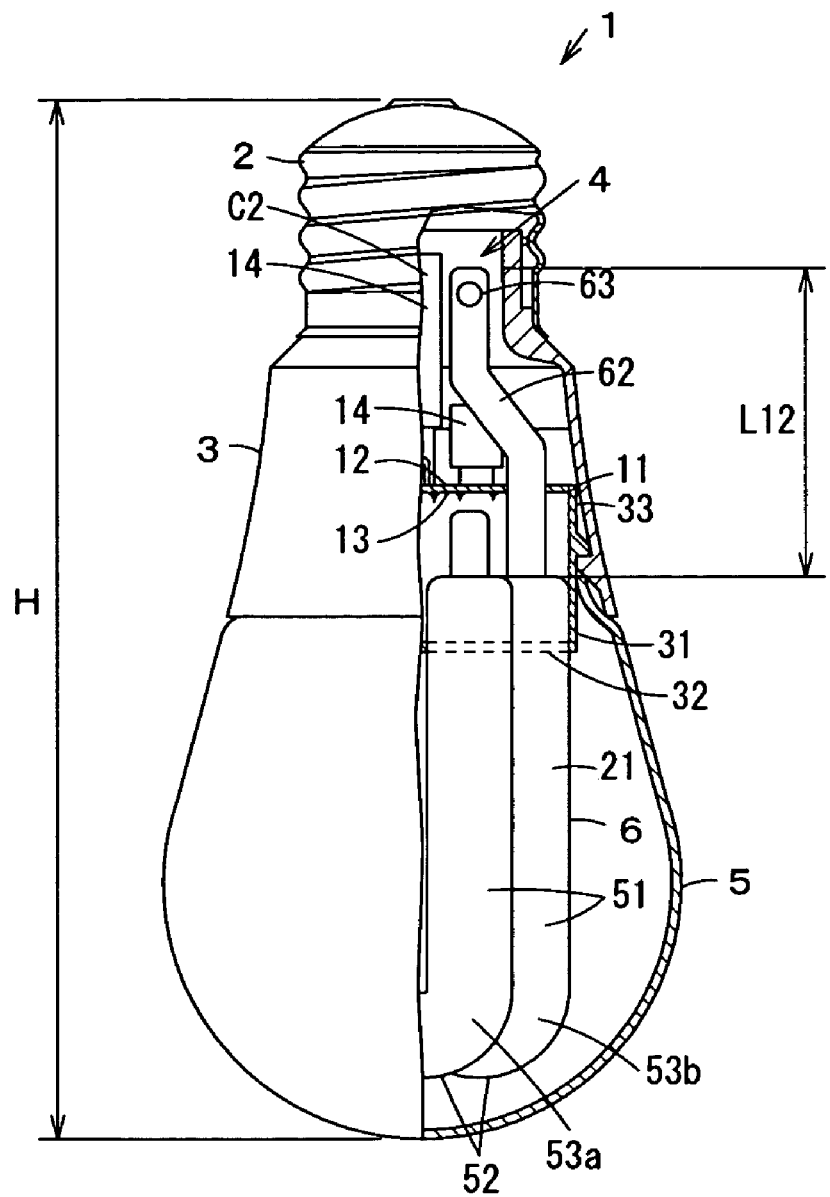
F I G. 6

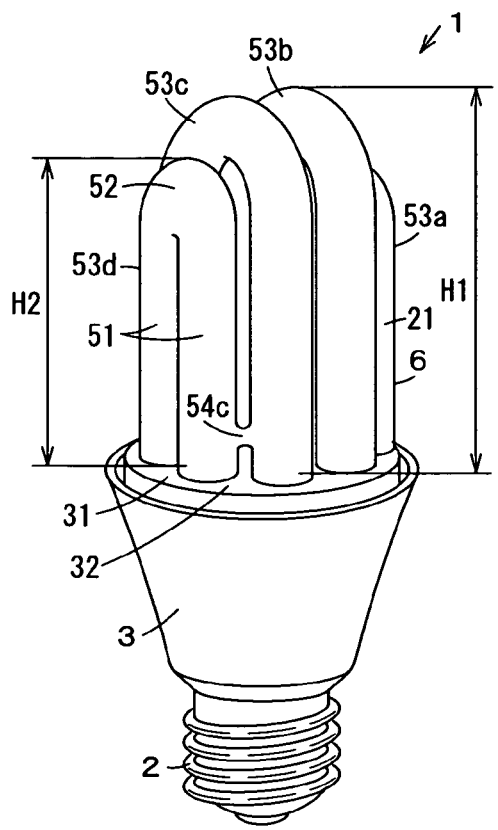
F I G. 7
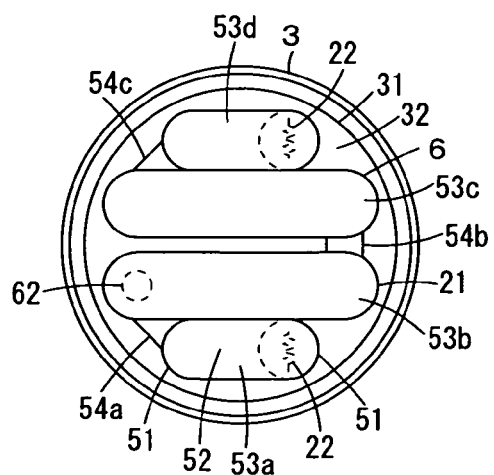
F I G. 8

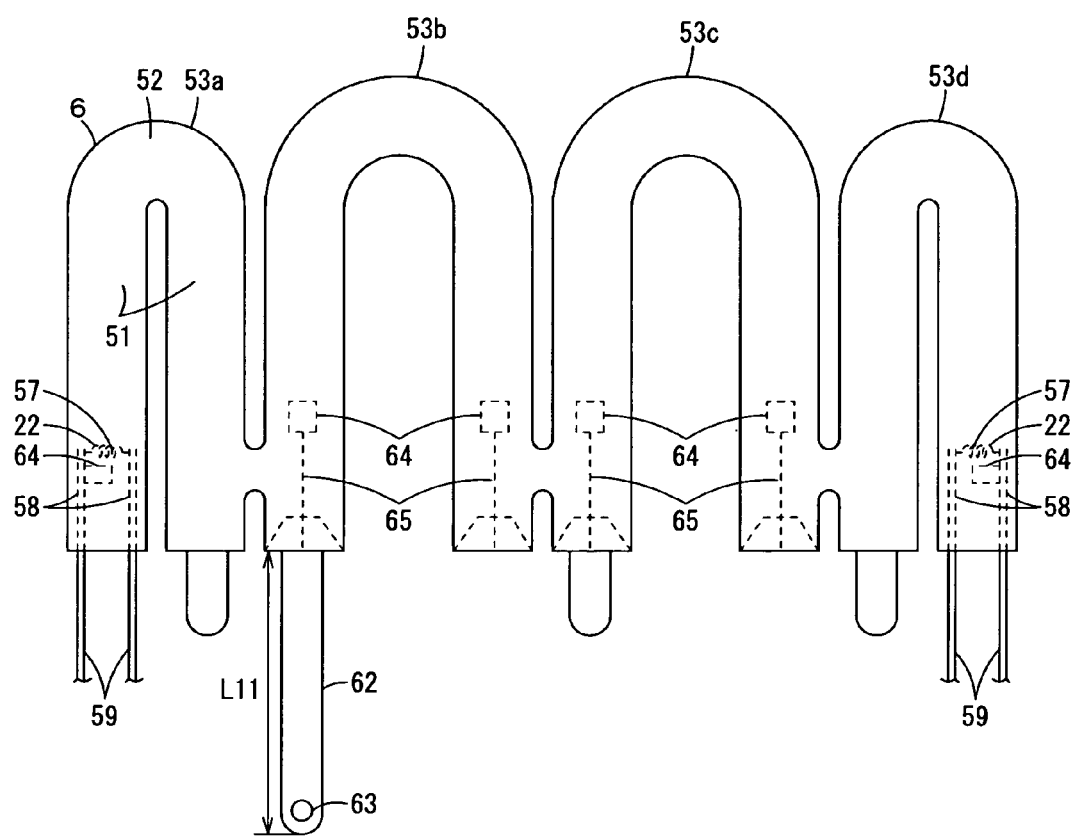
F I G. 1 1
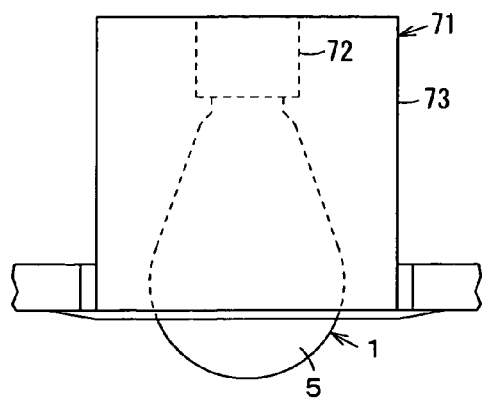
F I G. 1 2

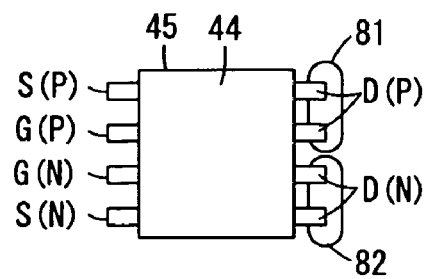
F I G. 1 3
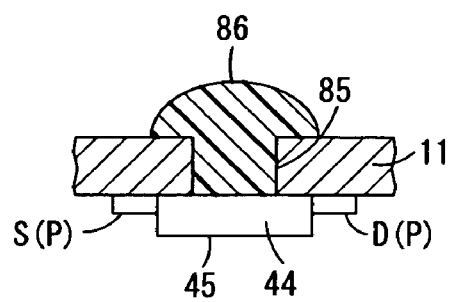
F I G. 1 4
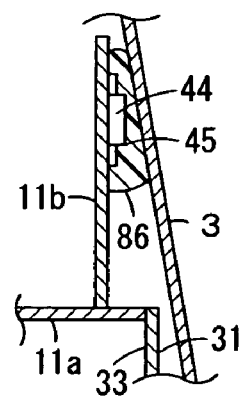
F I G. 1 5

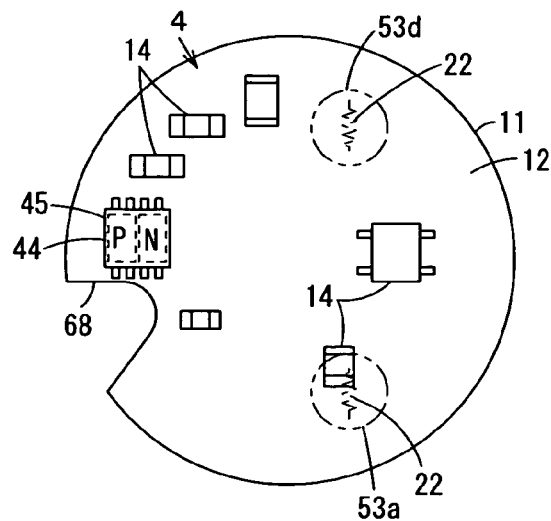
F I G. 1 6
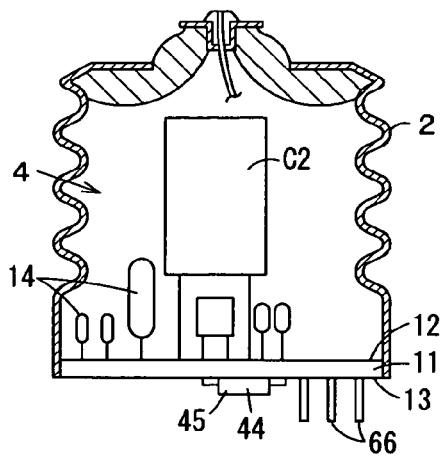
F I G. 1 7
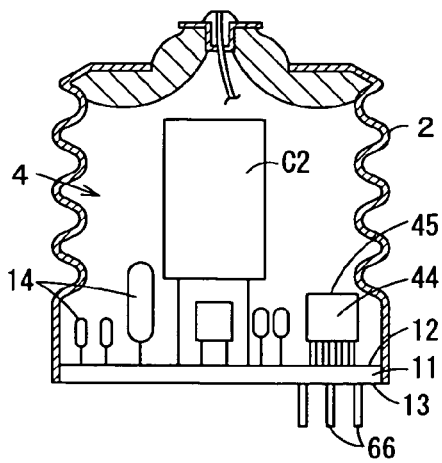
F I G. 1 8

SELF-BALLASTED FLUORESCENT LAMP AND LUMINAIRE

CROSS-REFERENCE TO PRIOR APPLICATION

This is a U.S. National Phase application under 35 U.S.C. §371 of International Patent Application No. PCT/JP2004/003196 filed Mar. 11, 2004, and claims the benefit of Japanese Patent Application No. 2003-081506 filed Mar. 24, 2003 both of which are incorporated by reference herein. The International Application was published in Japanese on Oct. 7, 2004 as WO 2004/085914 A1 under PCT Article 21(2).

TECHNICAL FIELD

The present invention relates to a fluorescent lamp, a self-ballasted fluorescent lamp provided with an inverter circuit for lighting the aforementioned fluorescent lamp, and a luminaire.

BACKGROUND OF THE INVENTION

A complementary half-bridge type inverter circuit with an N-type field effect transistor and a P-type field effect transistor that are connected in series is widely known to those skilled in the art. The sources of the N-type field effect transistor and the P-type field effect transistor of the inverter circuit are interconnected, while the gates of these transistors, too, are interconnected. The drains of the N-type and P-type field effect transistors are respectively connected to the positive electrode and the negative electrode of a DC power source.

An example of inverter circuits of this type described in Japanese Patent Laid-open No. 2003-18850, wherein an N-type field effect transistor and a P-type field effect transistor are contained in a single package with their terminals exposed to the outside. In this state, the N-type field effect transistor and the P-type field effect transistor serve as a switching element. The switching element is mounted on a circuit board in an upright position on the circuit board. The gates of the N-type and P-type field effect transistors are connected to a gate control circuit that is comprised of various components mounted on the circuit board.

As there is a demand for further miniaturization of a self-ballasted fluorescent lamp, it is necessary to reduce the dimensions of its inverter circuit even further. In order to achieve this, the switching element has to be made even more compact.

However, a switching element formed by merely placing both an N-type field effect transistor and a P-type field effect transistor in one package and mounting the package in an upright position on a circuit board as described in Japanese Patent Laid-open No. 2003-18850 presents problems in that there are limitations in how small the switching element can be made, because the lead terminals of the element require a certain degree of thickness in order to ensure sufficient mounting strength of the element. Furthermore, although Japanese Patent Laid-open No. 2003-18850 mentions using a switching element of a surface mounting type, there is no description of concrete measures to make the switching element compact nor discussion about performance of the switching element should it be used in an inverter circuit for a self-ballasted fluorescent lamp.

In order to solve the above problems, an object of the present invention is to provide a self-ballasted fluorescent lamp with improved mounting efficiency, and a luminaire including such a self-ballasted fluorescent lamp.

SUMMARY OF THE INVENTION

A self-ballasted fluorescent lamp according to the present invention has a fluorescent lamp, a lighting circuit, and a circuit board having a first face facing away from the fluorescent lamp and a second face facing towards the fluorescent lamp, the lighting circuit having inductors, capacitors, and a one-package switch that contains in a single package a pair of field effect transistors serving as inverter switches for driving the fluorescent lamp, at least both a smoothing capacitor and a current-limiting inductor, which have relatively large dimensions, mounted on the first face, wherein the one-package switch is a generally rectangular surface mounting device with a length and width respectively not exceeding 6 mm and provided with terminals extending from two opposing sides thereof so that the one-package switch is surface mounted on either the first face or the second face of the circuit board through the terminals. The configuration described above not only enables the reduction of the dimensions of the lighting circuit but also ensures that abnormal discharge at the end of the life of the fluorescent lamp causes rapid rise in temperature and subsequent self-destruction of the one-package switch at an early stage, thereby preventing the abnormal discharge from continuing for a long period of time.

According to another feature of the present invention, the fluorescent lamp of the self-ballasted fluorescent lamp has electrodes, and the one-package switch is surface mounted on the aforementioned second face of the circuit board, at a location apart from the electrodes. With the configuration as above, the one-package switch is less subject to the influence of heat from the electrodes.

The one-package switch of a self-ballasted fluorescent lamp according to yet another feature of the present invention is surface mounted on the second face of the circuit board, and no components are mounted on the area of the first face that corresponds to the area of the second face where the one-package switch is mounted. This feature is effective in reducing the influence of heat from the components mounted on the first face.

The one-package switch of a self-ballasted fluorescent lamp according to yet another feature of the present invention is surface mounted on the second face of the circuit board, and no components that emit heat are mounted on the area of the first face that corresponds to the area of the second face where the one-package switch is mounted. This feature is effective in reducing the influence of heat from the components that emit heat.

The one-package switch of a self-ballasted fluorescent lamp according to yet another feature of the present invention is surface mounted in such an orientation that the field effect transistor that has a higher on-resistance faces the peripheral edge of the circuit board. This configuration is effective in suppressing excessive heat generation by the field effect transistor during the time that the lamp is lit under normal conditions, thereby preventing premature destruction of the one-package switch.

A self-ballasted fluorescent lamp according to yet another feature of the present invention has a base disposed at the second-face side of the circuit board, a through hole formed through the circuit board so as to extend from the first face to the second face, a long-tip type capillary tube extending from the fluorescent lamp so that the tip of the capillary tube pass through the through hole towards the base, and a main amalgam enclosed in the capillary tube, wherein the one-package switch is mounted near the through hole. This configuration offers a fluorescent lamp with excellent luminous flux rise and is also capable of dissipating the heat of the one-package switch through the through hole.

According to yet another feature of the present invention, the circuit board of the self-ballasted fluorescent lamp is of a double-side mounting type, and the one-package switch is surfaced mounted on the first face of the circuit board. With this configuration, the influence of the heat from the fluorescent lamp on the one-package switch can be limited.

According to yet another feature of the present invention, the field effect transistors of the self-ballasted fluorescent lamp are complementary. Because of this feature, the field effect transistors enables simplification of the drive circuit and gate circuit and can be used in a self-excited oscillation circuit. Therefore, the inverter can be made more compact.

According to yet another feature of the present invention, the drain-source voltage of the field effect transistors is set at 200V or more, while the drain current of the field effect transistors is set at 0.5 A or more. With field effect transistors having such characteristics as above, an inverter circuit that is capable of driving the fluorescent lamp with an optical output power equivalent to an incandescent lamp can be formed.

A self-ballasted fluorescent lamp according to the present invention comprises a fluorescent lamp, a lighting circuit, a circuit board having a first face facing away from the fluorescent lamp and a second face facing towards the fluorescent lamp, and a base disposed at the second-face side of the circuit board, the lighting circuit having inductors, capacitors, and a one-package switch that contains in a single package a pair of field effect transistors serving as inverter switches for driving the fluorescent lamp, at least both a smoothing capacitor and a current-limiting inductor, which have relatively large dimensions, mounted on the first face, wherein the one-package switch is a generally rectangular mounting device with a length and width respectively not exceeding 6 mm, and the lighting circuit is contained in the base. The configuration described as above offers such benefits as it enables the reduction of the dimensions of the lighting circuit, permits the heat of the one-package switch to be dissipated through the base, and ensures that abnormal discharge at the end of the life of the fluorescent lamp causes rapid rise in temperature and subsequent self-destruction of the one-package switch at an early stage, thereby preventing the abnormal discharge from continuing for a long period of time.

According to yet another feature of the present invention, the base of the self-ballasted fluorescent lamp has an opening at the base end thereof; the circuit board is positioned so as to close off the opening of the base and the one-package switch is attached to the first face of the circuit board. This configuration enables the heat dissipation with an improved efficiency by protecting the one-package switch from the influence of heat from the fluorescent lamp.

A luminaire according to the present invention has a main body, and a self-ballasted fluorescent lamp, as described above. This feature of the invention offers an increased selection of luminaires to which a self-ballasted fluorescent lamp is applicable.

BRIEF DESCRIPTION OF THE DRAWINGS

FIG. 1 is a side view of a partially-cutaway self-ballasted fluorescent lamp according to an embodiment of the present invention;

FIG. 2 is an exploded side view of a base and its vicinity of the self-ballasted fluorescent lamp;

FIG. 3 is a top view of a one-package switch of the self-ballasted fluorescent lamp;

FIG. 4 is a side view of the one-package switch of the self-ballasted fluorescent lamp;

FIG. 6 is a side view of a partially-cutaway self-ballasted fluorescent lamp according to another embodiment of the present invention;

FIG. 7 is a perspective of the self-ballasted fluorescent lamp without a globe;

FIG. 8 is a bottom view of the self-ballasted fluorescent lamp without the globe;

FIG. 11 is a development of a fluorescent lamp of the self-ballasted fluorescent lamp;

FIG. 12 is a side view of a luminaire using the self-ballasted fluorescent lamp;

FIG. 13 is a top view showing the connection configuration of a one-package switch of the self-ballasted fluorescent lamp according to a further embodiment of the present invention;

FIG. 14 is a sectional view showing how a one-package switch of the self-ballasted fluorescent lamp according to an embodiment of the present invention is mounted;

FIG. 15 is a sectional view showing how a one-package switch of the self-ballasted fluorescent lamp according to a fifth embodiment of the present invention is mounted;

FIG. 16 is a bottom view of the second face of a circuit board of the self-ballasted fluorescent lamp according to a further embodiment of the present invention;

FIG. 17 is a side view of the base and its vicinity of the self-ballasted fluorescent lamp according to an embodiment of the present invention; and FIG. 18 is a side view of the base and its vicinity of the self-ballasted fluorescent lamp according to another embodiment of the present invention.

PREFERRED EMBODIMENT OF THE INVENTION

Next, embodiments of the present invention are explained hereunder, referring to relevant drawings.

Figure 5:
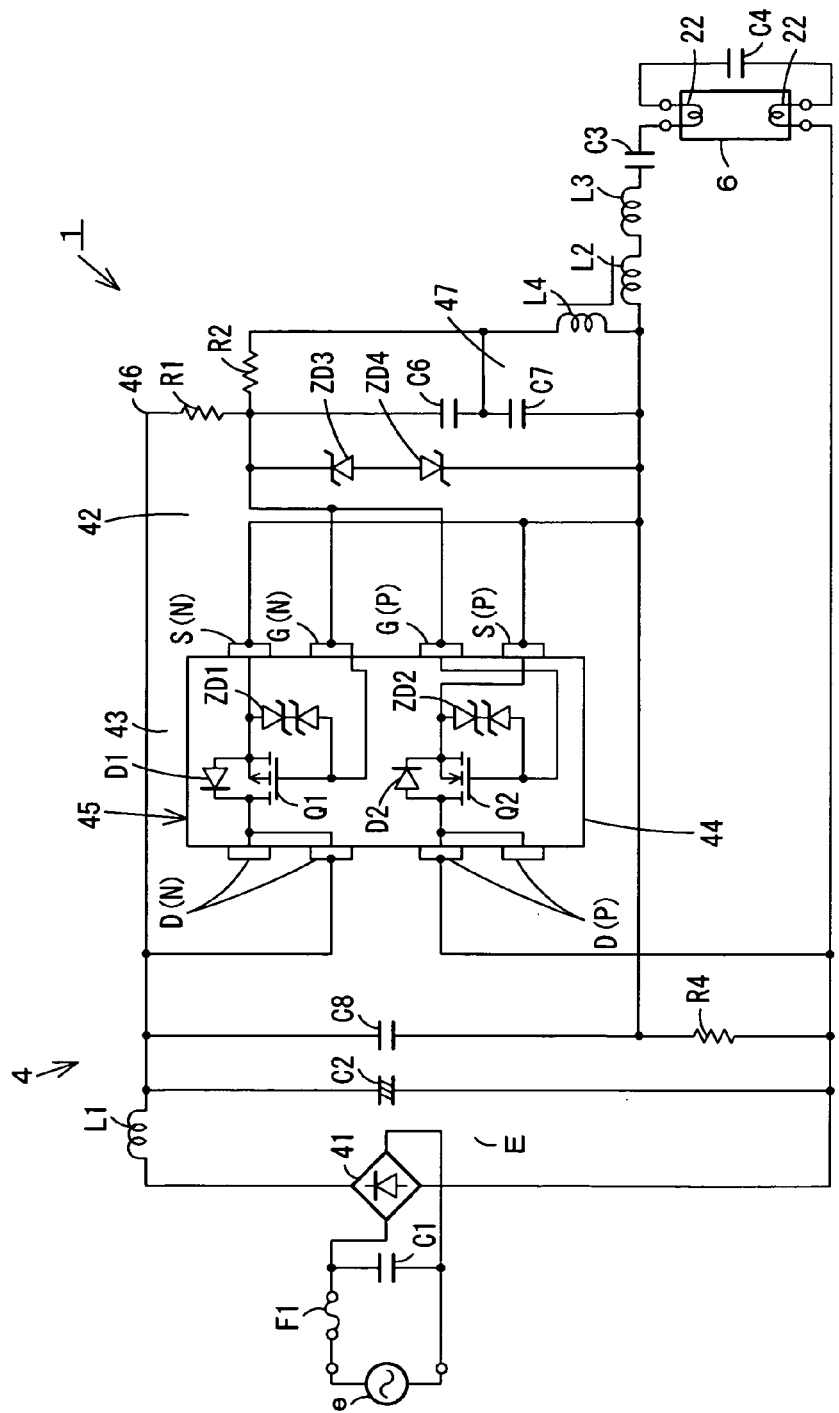
FIG. 5 is a circuit diagram of the self-ballasted fluorescent lamp.

An embodiment of the present invention is shown in FIGS. 1 to 5, wherein FIG. 1 is a side view of a partially-cutaway self-ballasted fluorescent lamp; FIG. 2 is an exploded side view of a base and its vicinity of the self-ballasted fluorescent lamp; FIG. 3 is a top view of a one-package switch of the self-ballasted fluorescent lamp; FIG. 4 is a side view of the one-package switch of the self-ballasted fluorescent lamp; and FIG. 5 is a circuit diagram of the self-ballasted fluorescent lamp.

As shown in FIGS. 1 and 2, numeral 1 denotes a self-ballasted fluorescent lamp, having a cover 3 with a base 2, a lighting circuit 4 serving as a lighting device and contained in the cover 3, a translucent globe 5, and a fluorescent lamp 6 contained in the globe 5. The base 2, the globe 5, and the cover 3 together form an envelope that has such an outer shape as to have nearly the same dimensions as standard dimensions of an incandescent lamp for general light, also referred to as a typical light bulb, e.g. a 60 W-type or 100 W-type incandescent lamp. The term "an incandescent lamp for general light" mentioned above or simply referred to as "typical light bulb" means a light bulb as defined by JIS Standard C 7501.

The cover 3 is formed of a heat resistant synthetic resin, such as polybutylene terephthalate (PBT), or any other appropriate material into an approximately cylindrical shape that flares towards the fluorescent lamp 6. The base 2, which may be of the Edison type, such as E26, is disposed over the cover 3 and fastened thereto with a bonding agent, or by other means such as crimping.

The globe 5 may be transparent or light-diffusing milky white. The globe 5 is formed of glass, synthetic resin, or the like into a smoothly curved shape nearly identical to the glass bulb of a typical light bulb. The edge of the opening of the globe 5 is formed into a fitting edge to be fitted in an opening of the cover 3. The luminance of the lamp may be made more uniform by forming the globe 5 in combination with another member, such as a diffusion film.

The lighting circuit 4 has an approximately disk-shaped circuit board 11 disposed in parallel with a plane that is perpendicular to the lengthwise direction of the fluorescent lamp 6. Electronic devices 14 that constitute the lighting circuit 4 are disposed on both sides of the circuit board 11, i.e. a first face 12 facing the base 2 (in other words facing away from the fluorescent lamp 6) and a second face 13 facing towards the fluorescent lamp 6 (in other words the reverse side to the first face 12).

The fluorescent lamp 6 has a glass bulb body 21. A phosphor layer, which may be three band phosphor, is formed on the inner surface of the bulb body 21. Discharge gas that contains a rare gas, such as argon, and mercury is sealed in the bulb body 21. As shown in FIG. 5, electrodes 22,22 are enclosed in both ends of the bulb body 21.

The bulb body 21 has three bent bulbs 23a,23b,23c, each of which is made of a generally cylindrical glass tube that is bent into a U-like shape with a smoothly curved bent portion at the middle. The bulb body 21 is fabricated by connecting each one of the two ends of the middle bulb 23b to one end of each respective end bulbs 23a,23c via a coupling tube (not shown) so as to form a single continuous discharge path.

In the state where the bulb body 21 is assembled in the self-ballasted fluorescent lamp 1, the bent portions of the bulbs 23a,23b,23c are aligned at regular intervals in a circle whose center corresponds to the longitudinal central axis of the lamp of the self-ballasted fluorescent lamp 1. The bulbs 23a,23b,23c are arranged so that their cross sections give the appearance of a triangle, with each bulb corresponding to a side of the triangle.

The fluorescent lamp 6 is fastened to a holder 31, which serves as a fluorescent lamp fastening member as well as a lighting circuit fastening member. The holder 31 is fixed to the cover 3. The holder 31 has a disk-shaped base portion 32, which is provided with a plurality of mounting holes (not shown). The bulb body 21 is fastened to the holder 31 with the ends of the bulbs 23a,23b,23c respectively inserted into the mounting holes and secured therein by means of, for example, bonding the areas of the bulbs to the base portion with an adhesive agent, such as silicone resin adhesive (not shown).

The holder 31 and the cover 3 are fastened to each other by fitting the holder 31 in the cover 3, and the fitting edge of the globe 5 between the holder 31 and the cover 3 and, in this state, filling the gap between the holder 31 and the cover 3 with a bonding agent. A mounting edge 33, which may have a cylindrical shape, rises from the top of the holder 31. The circuit board 11 of the lighting circuit 4 is fitted, bonded, or otherwise attached to the mounting edge 33.

As shown in FIG. 5, the lighting circuit 4 includes a capacitor C1, which constitutes a filter and is connected to a commercial AC power supply e via a fuse F1. The input terminal of a full-wave rectifying circuit 41 is connected to the capacitor C1. Through an inductor L1 that constitutes a filter, an electrolytic capacitor C2, which serves as a smoothing capacitor, is connected to the output terminal of the full-wave rectifying circuit 41. Thus, an input power circuit E is formed. An inverter main circuit 43 is connected to the electrolytic capacitor C2 of the input power circuit E and serves to generate a high frequency voltage by performing switching of a half-bridge type inverter circuit 42 adapted to generate high frequencies. Many of the electronic devices 14, including the electrolytic capacitor C2 of the input power circuit E, are mounted on the first face 12 of the circuit board 11.

The inverter main circuit 43 comprises a pair of serially connected field effect transistors (FET) Q1,Q2, which are structured complementary to each other so as to serve as an inverter switch and connected in parallel with the electrolytic capacitor C2. The field effect transistor Q1 is an N-channel MOS transistor, while the field effect transistor Q2 is a P-channel MOS transistor. Each field effect transistor Q1,Q2 is designed so that its drain-source voltage ($V_{DS}$) and drain current ($I_D$) are not less than 200V and 0.5 A, respectively.

As shown in FIGS. 3 to 5, the field effect transistors Q1,Q2 are switching elements that are incorporated in a single package 44 by simultaneously molding field effect transistors Q1,Q2 in the form of semiconductor chips with the same insulating molding material consisting of resin, glass, etc. As described above, the aforementioned switching elements are not formed by assembling two switching element consisting of individually molded field effect transistors and molding them into a single package, but by simultaneously molding a pair of unmolded field effect transistors Q1,Q2 in the form of semiconductor chips with the same molding material. Thus formed switching elements are collectively referred to as a one-package switch 45. The one-package switch 45 is a power package element that functions as a one-package dual field effect transistor element. The one-package switch 45 may be provided with 6-pin or 4-pin terminals.

The one-package switch 45 is a surface mount device and mounted on the second face 13 of the circuit board 11 as shown in FIGS. 1 and 2. The package 44 of the one-package switch 45 is formed in a generally rectangular flat plate. To be more specific, the one-package switch 45 has a length of not more than 6 mm (desirably around 5 mm), a width of not more than 6 mm (desirably around 4.5 mm), and a thickness of not more than 2 mm (desirably around 1.5 mm).

As shown in FIGS. 3 to 5, a pair of N-channel drain terminals D(N) serve as the drain of the field effect transistor Q1 of the one-package switch 45 and arranged side by side so as to project from one side of the package 44 and be exposed to the outside. An N-channel gate terminal G(N) and an N-channel source terminal S(N) respectively serve as the gate and source of the field effect transistor Q1 and arranged side by side so as to project from the opposite side of the package 44 and be exposed to the outside.

Likewise, a pair of P-channel drain terminals D(N) serve as the drain of the field effect transistor Q2 and arranged side by side so as to project from the first mentioned side of the package 44 and be exposed to the outside. These drain terminals D(P) and the aforementioned drain terminals D(N) of the field effect transistor Q1 are arranged at regular intervals. A P-channel gate terminal G(P) and a P-channel source terminal S(P) respectively serve as the gate and source of the field effect transistor Q2 and arranged side by side so as to project from the opposite side of the package 44 and be exposed to the outside. The gate terminal G(P) and the source terminal S(P), as well as the aforementioned gate terminal G(N) and source terminal S(N), are also arranged at regular intervals.

As shown in FIG. 4, the base portion of each one of the terminals, i.e. the drain terminals D(N),D(P), the gate terminals G(N),G(P), and the source terminals S(N),S(P), projects from a point halfway down the thickness of either side of the package 44, perpendicular to the side of the package 44, in other words in parallel with the obverse and reverse sides of the package 44. The middle portion of each terminal D(N),D(P),G(N),G(P),S(N),S(P) extends perpendicular to the obverse and reverse sides of the package 44, towards the reverse side.

The tip of each terminal D(N),D(P),G(N),G(P),S(N),S(P) extends in parallel and nearly flush with the reverse side of the package 44. In other words, the distal end of each terminal extends perpendicular to the sides of the package 44. To be more specific, the distal ends of the drain terminals D(N),D(P), the gate terminals G(N),G(P), and the source terminals S(N),S(P) are adapted to be connected to a land area of a circuit pattern formed on the second face 13 of the circuit board 11 when the reverse sides of the one-package switch 45 is brought to the second face 13 of the circuit board 11 and mounted thereon.

As shown in FIG. 5, the field effect transistors Q1,Q2 contained in the package 44 of the one-package switch 45 are respectively provided with diodes D1,D2, which are comprised of parasitic diodes.

A Zener diode ZD1,ZD2 is connected between the source and the gate of each field effect transistor Q1,Q2 in order to protect the corresponding field effect transistor Q1,Q2.

A series circuit of a primary winding L2 of a feedback transformer, a ballast choke L3 serving as a current limiting inductor, a DC interrupting capacitor C3, and a resonance capacitor C4, which is connected through filament coils of the electrodes 22,22 respectively provided at both ends of the fluorescent lamp 6, is connected between the drain and the source of the field effect transistor Q2. The capacitor C4 is connected to the non-inverter circuit ends of the filament coils of the respective electrodes 22,22 (in other words, the ends opposite the inverter main circuit 43). Therefore, the capacitor C4 functions as a preheating and start-up capacitor.

A starting resistor R1, which forms a part of an activating circuit 46, is connected between the electrolytic capacitor C2 and a connection point between the gate terminals G(N),G(P) of the field effect transistors Q1,Q2. In other words, the activating resistor R1 is connected between the drain D(N) of the field effect transistor Q1 and the connection point between the gate terminals G(N),G(P).

The aforementioned activating circuit 46 includes a charge loop that consists of resistors R1,R2,R4 and capacitors C6,C7. A load circuit that includes the aforementioned resonance capacitor C4 may be used as a part of the activating circuit 46.

A series circuit of a capacitor C6 and a capacitor C7, which is included in a gate control circuit 47, is connected between the gate terminals G(N),G(P) of the field effect transistors Q1,Q2 and the source terminals S(N),S(P) of the field effect transistors Q1,Q2. A series circuit of Zener diodes ZD3,ZD4 for protecting the field effect transistors Q1,Q2 is connected in parallel with the series circuit of the capacitors C6,C7.

The gate control circuit 47 is a self-oscillation drive circuit including the aforementioned primary winding L2 of the transformer, a secondary winding L4, the capacitors C6,C7, and the Zener diodes ZD3,ZD4. However, a separately excited drive circuit may be used instead.

The secondary winding L4 is magnetically connected to the primary winding L2 of the transformer. The secondary winding L4 also serves as an inductance element and is connected to a connection point between the capacitor C6 and the capacitor C7. The aforementioned resistor R2 of the activating circuit 46 is connected in parallel with the capacitor C6.

A series circuit of the resistor R4 of the activating circuit 46 and a capacitor C8, which serves to improve switching, is connected between the drain and source of the field effect transistor Q2. Furthermore, the source terminal S(N) of the field effect transistor Q1 and the source terminal S(P) of the field effect transistor Q2 are connected to a connection point between the resistor R4 and the capacitor C8.

As an alternative to a half-bridge type as described above, the inverter main circuit 43 may have two or more pairs of serially connected switching elements. One example of such a configuration is a full-bridge type. Furthermore, it does not matter whether the fluorescent lamp 6 is of a type that calls for preheating the filament coils of both electrodes 22,22 or a type wherein neither filament coil is preheated.

Most of the electronic devices 14 of the lighting circuit 4, including the electrolytic capacitor C2 and the ballast choke L3, are mounted on the first face 12 of the circuit board 11. The ballast choke L3 is disposed at the approximate center of the circuit board 11, and the electrolytic capacitor C2 is disposed on top of the ballast choke L3. A pair of lead wires of the electrolytic capacitor C2 are connected to the circuit board 11 through a lead wire insertion holes that are formed at an end of a bobbin case of the ballast choke L3 but not shown in the drawings. The pair of lead wires are bent into such a shape as to enable insertion into the lead wire insertion holes. Disposing the ballast choke L3 and the electrolytic capacitor C2, both of which are relatively large devices, one on top of the other at the approximate center of the circuit board 11 enables the reduction of the width of the circuit board 11, thereby making the whole lighting circuit compact. In addition to the aforementioned one-package switch 45, small electronic devices with a high allowable temperature limit, such as diodes and chip resistors, are mounted on the second face 13 of the circuit board 11.

With the configuration as above, when the power is fed from the commercial AC power supply e into the lighting circuit 4, the voltage on the commercial AC power supply e is rectified over the full wave by the full-wave rectifying circuit 41 and smoothed by the electrolytic capacitor C2.

As a result of increase in voltage on both ends of the electrolytic capacitor C2, the capacitors C6,C7 are charged through the resistors R1,R2 of the activating circuit 46 and other components, and the voltage is applied to the gate of the N-channel field effect transistor Q1, thereby turning on the field effect transistor Q1. As a result, electric current flows into the closed circuit consisting of the primary winding L2, the ballast choke L3, the capacitor C3, and the capacitor C4 so that the series resonance primarily generated by the ballast choke L3 and the capacitor C4 produces resonance voltage.

As the feedback current from the primary winding L2 induces voltage on the secondary winding L4, the relevant components, such as the capacitor C6 and the capacitor C7 of the gate control circuit 47, generate intrinsic resonance, thereby generating such a voltage as to turn on the field effect transistor Q1 and turn off the field effect transistor Q2.

When the resonance voltage in the circuit of the primary winding L2, the capacitor C3, the ballast choke L3, and the capacitor C4 is inverted thereafter, a voltage that is the reverse of the aforementioned voltage is generated on the secondary winding L4 so that the gate control circuit 47 generates such a voltage as to turn off the field effect transistor Q1 and turn on the field effect transistor Q2. Thus, self-oscillation is initiated.

When the resonance voltage in the circuit of the primary winding L2, the capacitor C3, the ballast choke L3, and the capacitor C4 is inverted further, the field effect transistor Q1 is turned on, while the field effect transistor Q2 is turned off.

Thereafter, the field effect transistor Q1 and the field effect transistor Q2 are alternately turned on and off in the same manner as above to generate resonance voltage so that a starting voltage is applied to the fluorescent lamp 6, which is connected in parallel with the capacitor C4, while the filament coils of the electrodes 22,22 are preheated. Thus, the fluorescent lamp 6 is started and becomes illuminated.

The Zener diodes ZD1,ZD2,ZD3,ZD4 unify the voltages on the gates of the field effect transistor Q1 and the field effect transistor Q2 and also protect the gates from an excessively high voltage.

Therefore, by using the N-channel field effect transistor Q1 and the P-channel field effect transistor Q2 and connecting the N-channel field effect transistor Q1 to the side where the electric potential is higher, both the N-channel field effect transistor Q1 and the P-channel field effect transistor Q2 can be controlled by a single control circuit, i.e. the gate control circuit 47.

According to the present embodiment described above, the one-package switch 45 is a generally rectangular surface mount device with a length and width respectively not exceeding 6 mm and mounted on the circuit board 11 through the terminals, which extend from two opposing sides of the package. Limiting the maximum length and width of the one-package switch 45 respectively to 6 mm reduces the necessary mounting area of the one-package switch 45 on the circuit board 11, enabling the increase in the mounting efficiency by utilizing the unoccupied area on the circuit board 11 for other purposes, e.g. printing wiring patterns, or mounting on the second face chips formed from some of the devices conventionally mounted on the first face. By thus increasing the mounting efficiency, the circuit board 11 can be made more compact.

Therefore, the configuration of the embodiment described above enables the one-package switch 45 to be mounted on the circuit board 11 with an increased mounting efficiency and simplifies the routing of the circuit, and is particularly suitable for a self-ballasted fluorescent lamp 1, which requires miniaturization of the circuit board 11. To be more specific, as the improved mounting efficiency of the field effect transistors Q1,Q2 enables the reduction of the dimensions of the inverter circuit 42, which includes these field effect transistors Q1,Q2, the dimensions of the circuit board 11 on which the inverter circuit 42 is mounted can be reduced. As a result, the self-ballasted fluorescent lamp 1 provided with the circuit board 11 can be made more compact.

As described above, the one-package switch 45 is a device produced by simultaneously molding the field effect transistors Q1,Q2 that are still in the form of semiconductor chips with the same insulating molding material, and is not more than 6 mm respectively in length and width. Therefore, the field effect transistors Q1,Q2 are susceptible to the influence of heat generated by each other during switching. Furthermore, because of their small volume, they are prone to temperature increase. Should an abnormal electrical discharge occur at the end of the life of the lamp or for other reasons, the increased lamp current increases the drain current, resulting in at least one of the field effect transistors Q1,Q2 generating excessive heat. As the field effect transistors Q1,Q2 molded in the one-package switch 45 are susceptible to the influence of increased quantity of heat of each other as described above, the field effect transistor that has caused excess of self-generated heat due to the abnormal discharge undergoes rapid increase in temperature and self-destruction at an early stage, resulting in termination of switching. The function of the one-package switch 45 described above serves as the safety function for preventing extended abnormal discharge at the end of the life of the lamp or other occasions. The one-package switch 45 is thus capable of limiting heat generation and other problems caused by abnormal discharge.

Because of their complementary property, the field effect transistors Q1,Q2 enables simplification of the drive circuit and gate circuit and can be used in a self-excited oscillation circuit. Therefore, the inverter circuit 42 can be made more compact.

By setting the drain-source voltage of the field effect transistors Q1,Q2 at not less than 200V and the drain current of the field effect transistors Q1,Q2 at not less than 0.5 A (not less than 1.0 A, depending on the type of usage), the inverter circuit 42 is enabled to drive the fluorescent lamp 6 with an optical output power that can be equivalent to an incandescent lamp.

In order to prevent increase of temperature of the one-package switch 45, a heat insulating material, such as glass wool, or other appropriate material may be provided between the circuit board 11 and the holder 31. If such is the case, the insulating material insulates the heat generated by the fluorescent lamp 6 and thereby mitigates heat conduction from the fluorescent lamp 6 to the circuit board 11. The simple configuration of the present invention reliably prevents increase in temperature of the one-package switch 45 mounted on the circuit board 11.

As the circuit board 11 used in the present embodiment is of a single-side mounting type, the one-package switch 45 is surface mounted on the second face 13 of the circuit board 11. However, using a circuit board 11 of a double-side mounting type enables the one-package switch 45 to be surface mounted on the first face 12 of the circuit board 11, making it possible to further mitigate the influence of the heat from the fluorescent lamp 6.

If there is no need of simplifying the structure by sharing the gate control circuit 47, the field effect transistors Q1,Q2 do not always have to be complementary. For example, both field effect transistors Q1,Q2 may be N-channel FETs.

Figure 9:
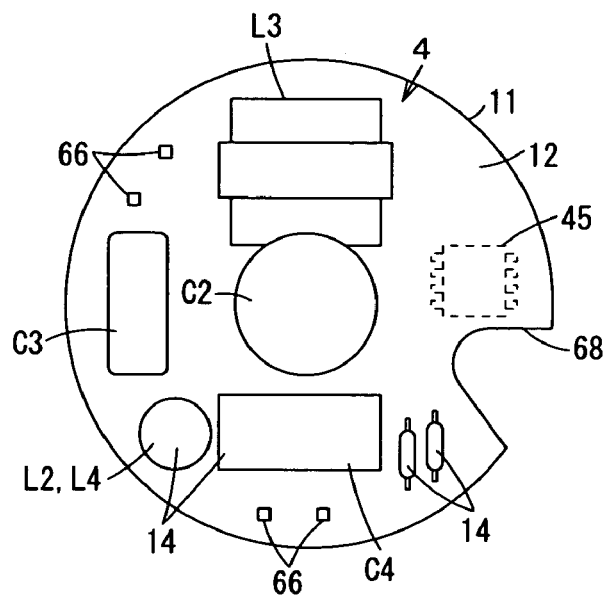
FIG. 9 is a top view of a first face of a circuit board of the self-ballasted fluorescent lamp.
Figure 10:
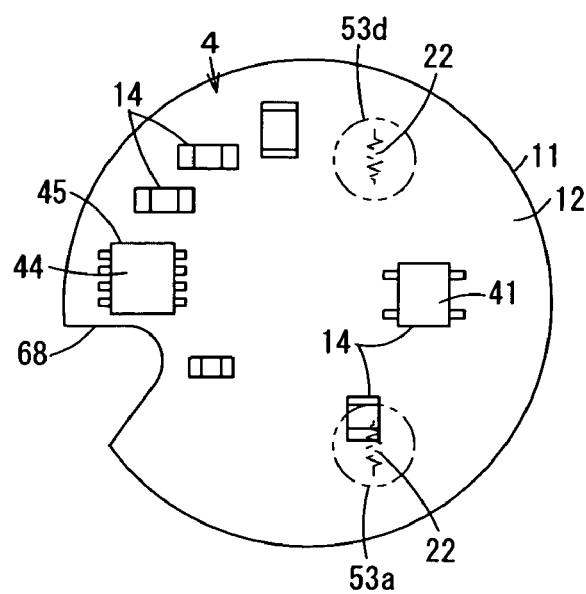
FIG. 10 is a bottom view of a second face of the circuit board of the self-ballasted fluorescent lamp.

Next, a self-ballasted fluorescent lamp according to another embodiment of the present invention is shown in FIGS. 6 to 12, wherein FIG. 6 is a side view of the self-ballasted fluorescent lamp shown in a partially-cutaway state; FIG. 7 is a perspective of the self-ballasted fluorescent lamp without a globe; FIG. 8 is a bottom view of the self-ballasted fluorescent lamp without the globe; FIG. 9 is a top view of a first face of a circuit board of the self-ballasted fluorescent lamp; FIG. 10 is a bottom view of a second face of the circuit board of the self-ballasted fluorescent lamp; FIG. 11 is a development of a fluorescent lamp of the self-ballasted fluorescent lamp; and FIG. 12 is a side view of a luminaire using the self-ballasted fluorescent lamp. The basic structure of the self-ballasted fluorescent lamp according to the present embodiment is similar to that of the self-ballasted fluorescent lamp 1 shown in FIGS. 1 to 5.

The self-ballasted fluorescent lamp 1 has an outer shape similar to that of a 60 W-type typical light bulb as defined by JIS Standard C 7501. The height H, i.e. the dimension from the base 2 to the crown of the globe 5 ranges from 110 to 125 mm (approximately 109 mm in the case of the present embodiment); the maximum outer diameter of the cover 3 ranges from approximately 35 to 45 mm; and the maximum outer diameter of the globe 5 ranges from approximately 55 to 65 mm.

The fluorescent lamp 6 has a curved bulb body 21 made of glass. A phosphor layer, which may be three band phosphor, is formed on the inner surface of the bulb body 21. A rare gas, such as argon, is sealed in the bulb body 21. According to the present embodiment, filler gas that is 99% or more argon is sealed in the bulb body 21 at a filling pressure of 300 to 800 Pa.

The bulb body 21 has four bulbs 53a,53b,53c,53d, each of which is formed into a U-like shape having a pair of straight portions 51 and a bent portion 52 by bending a straight, tubular bulb with an outer diameter d1 ranging from 7 to 9 mm at the middle portion. According to the present embodiment, each bulb 53a,53b,53c,53d is formed into a U-like shape by bending a cylindrical bulb with an outer diameter of approximately 8.5 mm and an inner diameter of approximately 6.5 mm.

The four bulbs 53a,53b,53c,53d are arranged so that their U-shaped surfaces extend side by side in parallel in parallel with one another, with their ends aligned in a circle whose center corresponds to the longitudinal central axis of the lamp of the self-ballasted fluorescent lamp 1. The bulbs 53a,53b,53c,53d are connected to one another by means of connecting tubes 54a,54b,54c. As shown in FIG. 8, the bulbs 53a,53d at the ends are respectively connected to the two bulbs 53b,53c by means of the connecting tubes 54a,54c, and the bulbs 53b,53c are connected to each other by the connecting tube 54b in such a manner that the bulbs 53b,53c are spaced apart by approximately 2 mm as viewed from the direction in which the U-shaped plane of each bulb extends, in other words as viewed from the curved end of the bent portions 52 of the bulbs. As shown in FIG. 8, each middle bulb 53b,53c and its adjacent end bulbs 53a,53d, in which each respective electrode 22,22 is sealed, are arranged close to one another so that there is no gap therebetween as viewed from the direction in which the U-shaped plane of each bulb extends, in other words as viewed from the curved end of the bent portions 52. To be more specific, the distance between the two straight portions 51 and the curvature of the bent portion 52 of each bulb 53a,53b,53c,53d are set so that the straight portions 51 of the bulbs 53a,53b,53c,53d are aligned nearly on the same circle whose center corresponds to the longitudinal central axis of the lamp. The connecting tubes 54a,54b,54c for connecting the bulbs 53a,53b,53c,53d to one another are formed so that each connecting tube 54a, 54b,54c extends nearly in parallel to the closest tangent to a hypothetical circle formed by the bulbs 53a,53b,53c,53d aligned in a circle the bulbs 53a,53b,53c,53d arranged within a circle with its center corresponding to the longitudinal central axis of the fluorescent lamp 6.

Each one of the electrodes 22,22 is enclosed in one of the two ends of each respective end bulb 53a,53d. Each electrode 22 has a filament coil 57, which is supported by a pair of weld wires 58. Through these weld wires 58 and lead wires 59 that are connected to dumet wires provided at a sealed portion, each filament coil 57 is led outside the bulb and connected to the lighting circuit 4.

The fluorescent lamp 6 is designed so that the height H1 of each middle bulb 53b,53c ranges from 55 to 65 mm, and the height H2 of each end bulb 53a,53d ranges from 45 to 55 mm, with H1 greater than H2 (H1>H2). According to the present embodiment, H1 and H2 are 55 mm and 50 mm, respectively. The four bulbs 53a,53b,53c,53d are serially connected to one another through the connecting tubes 54a,54b,54c so as to form a single continuous discharge path with a length ranging from 340 to 400 mm.

Of the four bulbs 53a,53b,53c,53d, neither of the two middle bulbs 53b,53c contains an electrode 22. A long-tip type capillary tube 62 formed of a glass bulb with an outer diameter ranging from 3.0 to 5.0 mm and an inner diameter ranging from 1.5 to 3.5 mm is enclosed in either one of or both of the aforementioned middle bulbs 53b,53c. The capillary tube 62 is not only used for sealing mercury, with a main amalgam enclosed in the tip of the capillary tube 62, but also serves as an exhaust tube. As shown in FIG. 11, the protrusion length L11, i.e. the length of the capillary tube 62 extends inside the cover 3 from the end of the bulb 53b, may desirably range from 25 to 50 mm so that the tip of the capillary tube 62 reaches the base 2. In the case of the present embodiment, the protrusion length L11 is set at approximately 45 mm in its straitened form. As shown in FIG. 6, the capillary tube 62 is bent at two locations into a curved shape with its distal end located closer to the center than is its base end so that the capillary tube 62 is prevented from coming into contact with the internal surface of the cover 3. The protrusion length L12, which is the actual distance from the end of the bulb 53b to the distal end of the bent capillary tube 62, is set at approximately 40 mm.

The main amalgam 63 enclosed in the tip of the capillary tube 62 comprises a base that is an alloy of bismuth (50-65% by mass) and tin (35-50% by mass), as well as mercury (12-25% by mass to the alloy).

An auxiliary amalgam 64 is disposed in each end of the middle bulbs 53b,53c. The two pairs of weld wires 58,58, which are respectively provided near the electrodes 22,22 of the end bulbs 53a,53d, are also provided with auxiliary amalgams 64. The auxiliary amalgams 64 disposed in the middle bulbs 53b,53c are attached to weld wires 65, which are attached to the ends of the bulbs 53b,53c by means of stem seal, pinch seal, or the like, and thus sealed in the bulbs. Thus, the auxiliary amalgams 64 are provided in the middle of the discharge path. Each auxiliary amalgam 64 is formed by plating a 2 mm×7 mm×40 μm stainless steel base plate with approximately 3 mg of gold (Au) or silver (Ag).

A plurality of mounting holes (not shown) adapted to receive the fluorescent lamp 6 are formed in the holder 31 for supporting the fluorescent lamp 6. The ends of the bulbs 53a,53b,53c,53d are respectively inserted into the mounting holes and secured therein by means of, for example, an adhesive agent, such as a silicone resin. A circuit board 11 is provided on the side on which the fluorescent lamp 6 is not provided.

The circuit board 11 has a shape resembling a disk whose diameter ranges up to 1.2 times (desirably up to 1.0 times) the maximum width of the bulb body 21. Should the circuit board 11 be in a polygonal or any other shape than a disk-like shape, the aforementioned diameter means the maximum dimension. In order to achieve dimensions and appearance similar to those of an incandescent lamp, it is desirable that the aforementioned diameter or the maximum dimension of the circuit board 11 range from 20 to 30 mm. In the case of the present embodiment, the diameter or the maximum dimension of the circuit board 11 can be limited within the aforementioned range by using a one-package switch 45. The circuit board 11 is provided with a through hole 68 having a diameter of 6 mm. The through hole 68 is formed at a location corresponding to the capillary tube 62 so as to permit insertion of the capillary tube 62. The tip of the capillary tube 62 is passed through the through hole 68 so as to reach the base 2, with the main amalgam 63, which is enclosed in the tip of the capillary tube 62, spaced apart by approximately 40 mm from the first face 12 of the circuit board 11.

Most of the electronic devices 14, including the electrolytic capacitor C2 for smoothing current, an inductor L1, a ballast choke L3, a primary winding L2 and a secondary winding L4 of a transformer, and capacitors C3,C4 for generating resistance or resonance, are mounted on the first face 12 of the circuit board 11, in other words the surface facing the base 2. In addition to the surface-mounted one-package switch 45, small electronic devices with a high allowable temperature limit, such as rectifier-diodes (REC) of a full-wave rectifying circuit 41 and chip resistors, are mounted on the second face 13 of the circuit board 11, i.e. the surface facing the fluorescent lamp 6. The end of the electrolytic capacitor C2 protrudes further towards the base 2 than are the electronic devices 14 that generate a relatively large amount of heat, such as the inductor L1, the ballast choke L3, the primary and secondary windings L2,L4 of the transformer, and the capacitors C3,C4 for generating resistance or resonance. A pair of wrapping pins 66 protrude from the first face 12 of the circuit board 11 so that the lead wires 59 of each electrode 22 can be wrapped around each respective wrapping pin 66 and electrically connected thereto.

As shown in FIGS. 9 and 10, the one-package switch 45 is surface mounted on the second face 13 of the circuit board 11, at a location near the through hole 68 and apart from the electrodes 22,22 of the fluorescent lamp 6 and the wrapping pins 66, all of which become relatively hot during the time that the lamp is lit. No electronic devices 14, including those that emit heat, are mounted on the area of the first face 12 that corresponds to the area of the second face 13 where the one-package switch 45 is mounted.

The self-ballasted fluorescent lamp 1 structured as above has such characteristics that, when a rated input power is 13 W, a total luminous flux of 810 lm can be achieved by using three band phosphor.

The lighting circuit 4 is adapted to be lit at a lamp power of 7 to 15 W with a current density (amount of current per unit area) of 3 to 5 A/mm$^2$. The self-ballasted fluorescent lamp 1 according to the present embodiment has such characteristics that, when a rated input power is 12 W, a high frequency power of 10.5 W is applied to the fluorescent lamp 6, producing a lamp current of 190 mA, a lamp voltage of 58 V, and a total luminous flux of 810 lm, which results from the optical output power from the fluorescent lamp 6.

Because the lighting circuit 4 is positioned near the fluorescent lamp 6, which is the principal heat emitting element, the vicinity of the lighting circuit 4 is prone to high temperatures. As a result, the heat is diffused towards the base 2 as well as radially outward, and a high temperature area is formed near the ballast choke L3 and the one-package switch 45, which are principal heat emitting devices of the lighting circuit 4. Of the space inside the cover 3, the temperature of the vicinity of the base 2 is relatively lower than the temperature of the devices mounted within the aforementioned high temperature area. Therefore, disposing the main amalgam at a location near the base 2 by the use of the capillary tube 62 enables the reduction of the temperature of the main amalgam 63. The electrolytic capacitor C2, which is positioned near the main amalgam 63, emits hardly any heat, and the temperature of the internal space near the base 2 ranges from approximately 50 to 60°. For the sake of comparison, the temperature of the main amalgam 63 enclosed in a short capillary tube 62 with a protrusion length of approximately 10 mm was measured to be approximately 90° C. However, a long-tip type capillary tube, which permits the main amalgam 63 to be positioned close to the base 2, is effective in lowering the temperature of the main amalgam 63 by approximately 30 to 40° C. compared by the short-tip capillary tube.

As the self-ballasted fluorescent lamp 1 provided with a long-tip type capillary tube 62 is thus capable of lowering the temperature of the main amalgam 63 during the time that the lamp is lit, an amalgam with a high mercury vapor pressure can be used as the main amalgam. Furthermore, the auxiliary amalgams 64 emit an appropriate quantity of mercury, thereby preventing mercury deficiency immediately after start-up, and ensuring prompt rise of luminous flux. It was confirmed that an optical output power of approximately 50% that of the optical output power during the stable lighting period was obtained when 5 seconds elapsed after start-up of the light circuit and an optical output power of approximately 85% after approximately 25 seconds.

When a self-ballasted fluorescent lamp 1 designed as described above is used in a luminaire 71 for a typical light bulb as shown in FIG. 12, light distribution from the self-ballasted fluorescent lamp 1 is similar to that of a typical light bulb so that a reflector 73, which is disposed near a socket 72 provided inside the luminaire 71, is ensured to be illuminated with a sufficient amount of light and provide performance precisely specified by its optical design. Furthermore, as the light distribution from the self-ballasted fluorescent lamp 1 is similar to that of a typical light bulb, the self-ballasted fluorescent lamp 1 described above can be used with an agreeable appearance even in a floor lamp, desk lamp, or a similar luminaire where the shape of an internal light source is projected on a light-diffusing cover, such as cloth cover.

The structure of the fluorescent lamp used for a self-ballasted fluorescent lamp of the present invention is not limited to those described as above, where the fluorescent lamp is comprised of U-shaped bulbs connected to one another. Examples of other applicable fluorescent lamps include, but not limited to, a fluorescent lamp having a bulb curved in a spiral and an electrodeless fluorescent lamp.

The self-ballasted fluorescent lamp 1 according to the present embodiment offers the same effects and functions as those of the self-ballasted fluorescent lamp 1 shown in FIGS. 1 to 5. To be more specific, its one-package switch 45 is a generally rectangular surface mount device with a length and width respectively not exceeding 6 mm and mounted on the circuit board 11 through the terminals, which extend from two opposing sides of the package. With the configuration as above, compared with conventional switching elements, the one-package switch 45 requires less mounting area, resulting in an improved mounting efficiency. Furthermore, reduction in the size of the one-package switch 45 by limiting its length and width up to 6 mm respectively offers a safe and secure lighting circuit by ensuring prompt termination of the inverter circuit 42 through self-destruction of the one-package switch 45 at an end of the life of the lamp or in other abnormal occasion.

As the one-package switch 45 is surface mounted on the second face 13 of the circuit board 11 and thus spaced apart from the electrodes 22,22 of the fluorescent lamp 6, it is less susceptible to thermal influence of the electrodes 22,22. Moreover, as the one-package switch 45 is mounted near the through hole 68 of the circuit board 11, the heat of the one-package switch 45 can be effectively dissipated by convection through the through hole 68 to the space near the base 2, where the heat dissipation rate is relatively high, or conduction to relatively cool members near the through hole 68.

No electronic device 14 is mounted on the area of the first face 12 that corresponds to the area of the second face 13 of the circuit board 11 where the one-package switch 45 is mounted. This feature not only ensures the effective heat dissipation from the first face 12 but also makes the one-package switch 45 less subject to thermal influence of heat generating devices.

Furthermore, as the area of the first face 12 that corresponds to the area on which the one-package switch 45 is mounted has no electronic devices 14 mounted thereon, it is possible to display the production lot number of the circuit or other information on the unoccupied area by laser impression or by other appropriate means.

The circuit board 11 of a self-ballasted fluorescent lamp 1 according to any one of the embodiments described above may be provided with lands 81,82, each of which is connected to a pair of drain terminals D(N) or a pair of drain terminals D(P) respectively as shown in FIG. 13. As each land 81,82 is shared by the corresponding pair of the drain terminals, each land 81,82 has a greater area and requires a greater amount of solder, resulting in increased heat dissipation from the lands 81,82.

As shown in FIG. 14, a hole 85 may be formed in the area of the circuit board 11 on which the one-package switch 45 will be surface mounted. By filling this hole 85 with a filler (an adhesive agent) 86, such as a silicone resin, so that the filler 86 comes into contact with the one-package switch 45, heat dissipation from the one-package switch 45 can be increased through the filler 86.

Furthermore, as shown in FIG. 15, the circuit board 11 may be divided into a circuit board 11a and a circuit board 11b. The circuit board 11a, adapted to be attached to holder 31, has a surface perpendicular to the longitudinal direction of the fluorescent lamp 6. The circuit board 11b has a surface perpendicular to the circuit board 11a and is adapted to be positioned in the space facing the base 2 in the state that one end of the circuit board 11b is mechanically and electrically connected to the circuit board 11a. In the case of this configuration, the one-package switch 45 is mounted on the circuit board 11b. When this configuration is employed, the heat dissipation function of the outer surface of the cover 3 can be utilized for effective release of heat from the one-package switch 45 by bringing the one-package switch 45 and the inner surface of the cover 3 close to each other and filling a gap therebetween with a filler 86, such as a silicone resin. In addition to the one-package switch 45, other components having relatively low heat resistance may be mounted on the circuit board 11b so as to reduce the thermal influence of the fluorescent lamp 6.

On-resistance of the P-type field effect transistor Q2 has higher electrical characteristics than those of on-resistance of the N-type field effect transistor Q1. Therefore, in the circuit board 11 shown in FIG. 16, the one-package switch 45 is surface mounted in such an orientation that the P-type field effect transistor Q2, which has a higher on-resistance, faces the peripheral edge of the circuit board 11. This configuration calls for positioning the P-type field effect transistor Q2, which has a higher on-resistance and therefore more prone to generating heat, closer to the peripheral edge of the circuit board 11, in other words closer to the cover 3, because the temperature distribution near the surface of the circuit board 11 during the time that the lamp is lit has such characteristics that the closer to the cover 3, which is dissipating heat, the lower the temperature. This configuration enhances heat dissipation properties of the P-type field effect transistor Q2, thereby preventing premature destruction that would otherwise result from thermal influence.

FIG. 17 shows a configuration that calls for positioning the circuit board 11 so as to close off the opening at the base end of the base 2. As most of the electronic devices 14 of the lighting circuit 4 are positioned inside the base 2, the heat conducted from the one-package switch 45 to the circuit board 11 can be effectively dissipated through the base 2.

When this configuration is employed, the heat dissipation efficiency can be further improved by mounting the one-package switch 45 on the first face 12 of the circuit board 11 as shown in FIG. 18 so that the one-package switch 45 is positioned inside the base 2 and protected from the influence of heat from the fluorescent lamp 6. The one-package switch 45 may be surface mounted on the first face 12 of the circuit board 11 or disposed upright on the first face 12. However, by surface mounting the one-package switch 45 on the first face 12, thermal influence of the fluorescent lamp 6 on the one-package switch 45 can be limited.

POSSIBLE INDUSTRIAL APPLICATION

As the use of a one-package switch enables the reduction of the dimensions of the lighting circuit and a circuit board, the self-ballasted fluorescent lamp can be made compact. Therefore, a self-ballasted fluorescent lamp according to the present invention can be used in a wide variety of luminaire that uses a typical light bulb.

The invention claimed is:

1. A self-ballasted fluorescent lamp comprising:
    a fluorescent lamp;
    a lighting circuit having a one-package switch, inductors, and capacitors, said one-package switch containing in a single package a pair of field effect transistors that serve as inverter switches for driving the fluorescent lamp, said field effect transistors being complementary; and
    a circuit board having a first face facing away from said fluorescent lamp and a second face facing towards said fluorescent lamp, said first face having at least both a smoothing capacitor and a current-limiting inductor, which have relatively large dimensions, mounted thereon; wherein:
    said one-package switch is a generally rectangular surface mounting device with a length and width respectively not exceeding 6 mm and provided with terminals extending from two opposing sides thereof; and
    said one-package switch is surface mounted on either said first face or said second face of said circuit board through said terminals,
    wherein paired drain terminals for each complementary field effect transistor are arranged side-by-side and project from one side of the package, and a gate terminal and source terminal for each complementary field effect transistor are arranged side by side and project from an opposing side of the package.

2. A self-ballasted fluorescent lamp as claimed in claim 1, wherein: said fluorescent lamp has electrodes; and said one-package switch is surface mounted on said second face of said circuit board, at a location apart from said electrodes.

3. A self-ballasted fluorescent lamp as claimed in claim 1, wherein: said one-package switch is surface mounted on said second face of said circuit board; and no components are mounted on the area of said first face that corresponds to the area of said second face where said one-package switch is mounted.

4. A self-ballasted fluorescent lamp as claimed in claim 1, wherein: said one-package switch is surface mounted on said second face of said circuit board; and no components that emit heat are mounted on the area of said first face that corresponds to the area of said second face where said one-package switch is mounted.

5. A self-ballasted fluorescent lamp as claimed in claim 1, wherein: said one-package switch is surface mounted in such an orientation that the field effect transistor that has a higher on-resistance faces the peripheral edge of said circuit board.

6. A self-ballasted fluorescent lamp as claimed in claim 1, wherein: said self-ballasted fluorescent lamp comprises:
 a base disposed at said second-face side of said circuit board;
 a through hole formed through said circuit board so as to extend from said first face to said second face;
 a long-tip type capillary tube extending from said fluorescent lamp so that the tip of said capillary tube pass through said through hole towards said base, and
 a main amalgam enclosed in said capillary tube;
 wherein: said one-package switch is mounted near said through hole.

7. A self-ballasted fluorescent lamp as claimed in claim 1, wherein: said circuit board is a double-side mounting type; and said one-package switch is surface mounted on said first face of said circuit board.

8. A self-ballasted fluorescent lamp as claimed in claim 1, wherein: the drain-source voltage of said field effect transistors is set at 200V or more, and the drain current of said field effect transistors is set at 0.5 A or more.

9. A self-ballasted fluorescent lamp as claimed in claim 1, wherein: said base has an opening at the base end thereof; said circuit board is positioned so as to close off said opening; and said one-package switch is attached to said first face of said circuit board.

10. A luminaire comprising: a main body; and a self-ballasted fluorescent lamp as claimed in claim 1, said self-ballasted fluorescent lamp attached to said main body.

11. A self-ballasted fluorescent lamp comprising:
 a fluorescent lamp;
 a lighting circuit having a one-package switch, inductors, and capacitors, said one-package switch containing in a single package, a pair of field effect transistors that serve as inverter switches for driving the fluorescent lamp, said field effect transistors being complementary;
 a circuit board having a first face facing away from said fluorescent lamp and a second face facing towards said fluorescent lamp, said first face having at least both a smoothing capacitor and a current-limiting inductor, mounted thereon; and
 a base disposed at the second-face side of said circuit board; wherein:
 said one-package switch is a generally rectangular surface mounting device with a length and width respectively not exceeding 6 mm; and said lighting circuit is contained in said base, and paired drain terminals for each complementary field effect transistor are arranged side-by-side and project from one side of the package, a gate terminal and source terminal for each complementary field effect transistor are arranged side by side and project from an opposing side of the package.

12. A luminaire comprising: a main body; and a self-ballasted fluorescent lamp as claimed in claim 11, said self-ballasted fluorescent lamp attached to said main body.

* * * * *